March 16, 1937. W. W. BROUGHTON 2,073,678
CUTTING TOOL
Filed Sept. 28, 1935
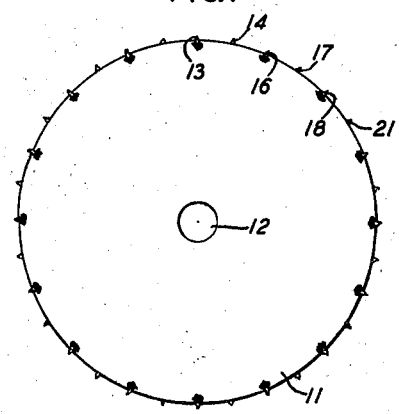
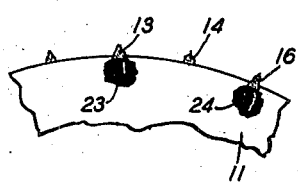
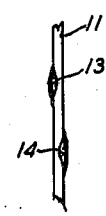
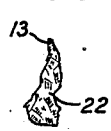
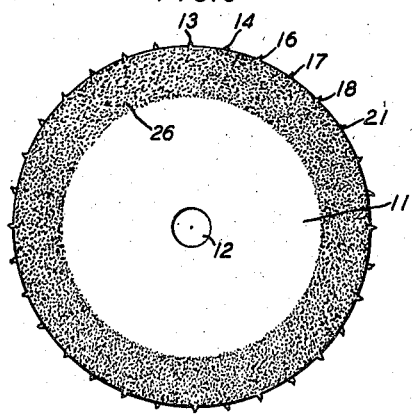
INVENTOR
W. W. BROUGHTON
BY
E. V. Griggs
ATTORNEY Patented Mar. 16, 1937

2,073,678

UNITED STATES PATENT OFFICE 2,073,678

CUTTING TOOL

William W. Broughton, New Brighton, N. Y., assignor to Bell Telephone Laboratories, Incorporated, New York, N. Y., a corporation of New York Application September 28, 1935, Serial No. 42,568

2 Claims. (Cl. 125—15)

This invention relates to cutting tools and particularly to a diamond-charged saw blade for cutting thin plates.

An object of the invention is to facilitate the preparation and improve the operation of diamond-charged blades.

Lapidarists and other artisans have for a generation or more used so-called diamond-charged saws in their work, the blades usually being of some soft material such as soft copper and the abrasive being diamond dust applied with oil. It has been recognized that the use of discrete diamond particles instead of the diamond dust would result in certain advantages and attempts have been made from time to time to "charge" a blade with such discrete particles. The usual method has involved punching or drilling holes in the periphery of the blade and positioning the diamond particles in these apertures. Blades produced in this manner, however, have been found to be relatively expensive and unsatisfactory for certain other reasons.

In accordance with a feature of the present invention, discrete diamond particles are attached directly to the surface of the blade, for example by soldering, the particles being provided with a coating of metal, preferably by the sputtering process. This feature results in a more economical arrangement than that referred to above as the necessity of providing apertures in the blade is eliminated.

According to another feature of the invention, a relatively thick coating of metal is applied to the rim of the blade, preferably by electroplating, after the diamond particles have been attached to the blade. This feature results in firmly anchoring the diamond particles in place and also in building up the thickness of the periphery of the blade in order to provide the necessary clearance for the body of the blade.

Blades prepared in accordance with the features of this invention have proven particularly valuable for cutting quartz plates although the invention is by no means limited to this specific use.

A complete understanding of the invention and appreciation of the valuable features thereof may be obtained by considering the following detailed description in connection with the annexed drawing in which:

Fig. 1 is a side elevation of a saw blade having diamond particles attached around the periphery;

Fig. 2 is an end view of the blade shown in Fig. 1;

Fig. 3 is an enlarged side view of a portion of the blade showing more clearly the attachment of the diamond particles;

Fig. 4 is an enlarged end view of a portion of the blade;

Fig. 5 is an enlarged view of one of the diamond particles showing the sputtered coating;

Fig. 6 is a side elevation of the blade after a coating of metal has been applied to the rim by electroplating; and Fig. 7 is an end view of the blade shown in Fig. 6.

Referring now to the drawing, a saw blade 11 is shown which comprises a relatively thin disk of some metal such for example, as steel. A hole 12 is provided in the center of the blade to facilitate mounting on the driving shaft. A plurality of diamond particles as 13, 14, 16, 17, 18 and 21 are attached for example by soldering, to the periphery of blade 11, these particles being, as more clearly shown in Fig. 2, mounted alternately on opposite sides of the blade.

Before the diamond particles are attached to the blade they are preferably provided with a metal coating in order to facilitate the attachment of the hard jewels to the metal blade. The particles may, for example, be sputtered with gold as shown in Fig. 5, an enlarged view of one of the diamond particles 13. Here a coating of gold 22 is shown.

As clearly shown in Figs. 3 and 4, the particles are so mounted that their tips project beyond the edge of the blade, the solder 23, 24 preferably enclosing substantially the entire body of the particles and extending out somewhat over the surface of the blade. The metal coating on the diamond particles permits a firm bond between the particles and the metal disk.

After the diamond particles have been attached to the blade as above described, a relatively heavy metal coating 26 (Figs. 6 and 7) which may be, for example, copper is applied, preferably, by electroplating, to the rim of blade 11. As shown in Fig. 7 the coating 26 is applied to both sides of the blade at the rim, a protective mat preferably being utilized during the process to prevent application of the coating to the central portion of the blade. This metal coating serves to anchor the diamond particles securely in place on the blade and also serves to build up the thickness of the periphery of the blade to provide proper clearance when the saw is in use.

During the application of coating 26 the tips of the diamond particles may become covered.

In such a case the coating is usually ground down by a file or other tool until the tips of all the particles are exposed. When the blade is placed in use, moreover, the metal coating is quickly worn away from the tips of the particles by contact with the work.

While certain specific embodiments of the invention have been selected for detailed description, the invention is not of course, limited in its application to the embodiments described. For example, while the diamond particles were described as being attached by soldering to the blade, other methods of attachment, for example cementing, may be followed. Further the metal coating 26 may be applied by methods other than electroplating. Again, while the charging method has been described in connection with a saw blade, it is equally applicable in connection with other types of cutting tools such as grinding wheels, laps and the like. In short, the embodiments of the invention which have been specifically described should be taken as illustrative of the invention rather than as restrictive thereof.

What is claimed is:

1. In a saw, a blade, a plurality of discrete diamond particles at regularly spaced locations at the periphery of said blade, said particles being so located that a portion of the surface of each projects beyond the edge of the blade, adjacent particles being on opposite sides of said blade, means individual to each of said particles for temporarily attaching each particle in position on said blade independently of all the other particles, and means common to all the particles for permanently attaching them to the blade, said last-mentioned means comprising a metal coating covering the rim of the blade, each of said individual attaching means and substantially the entire surfaces of said diamond particles.

2. In a saw, a blade, a plurality of discrete diamond particles at regularly spaced locations at the periphery of said blade, said particles being so located that a portion of the surface of each projects beyond the edge of the blade, adjacent particles being on opposite sides of said blade, means individual to each of said particles for temporarily attaching each particle in position on said blade independently of all the other particles, said temporary attaching means comprising drops of solder, and means common to all the particles for permanently attaching them to the blade, said last-mentioned means comprising a metal coating covering the rim of the blade, each of said individual attaching means and substantially the entire surfaces of said diamond particles.

WILLIAM W. BROUGHTON.